US010353721B2

(12) United States Patent
Patel

(10) Patent No.: US 10,353,721 B2
(45) Date of Patent: Jul. 16, 2019

(54) SYSTEMS AND METHODS FOR GUIDED LIVE HELP

(71) Applicant: Sundeep Harshadbhai Patel, Boston, MA (US)

(72) Inventor: Sundeep Harshadbhai Patel, Boston, MA (US)

(*) Notice: Subject to any disclaimer, the term of this patent is extended or adjusted under 35 U.S.C. 154(b) by 79 days.

(21) Appl. No.: 15/070,993

(22) Filed: Mar. 15, 2016

(65) Prior Publication Data

US 2017/0269945 A1    Sep. 21, 2017

(51) Int. Cl.
| | |
|---|---|
| *G06F 9/451* | (2018.01) |
| *G06F 3/14* | (2006.01) |
| *G06F 3/0484* | (2013.01) |
| *G06F 8/38* | (2018.01) |

(52) U.S. Cl.
CPC ............ *G06F 9/453* (2018.02); *G06F 3/0484* (2013.01); *G06F 3/14* (2013.01); *G06F 8/38* (2013.01); *G09G 2370/022* (2013.01); *G09G 2370/027* (2013.01)

(58) Field of Classification Search
None
See application file for complete search history.

(56) References Cited

U.S. PATENT DOCUMENTS

| 6,692,256 B2 | 2/2004 | Chan et al. |
| 9,183,752 B2 | 11/2015 | Nickell et al. |
| 9,582,132 B1 | 2/2017 | Adelman et al. |
| 2003/0101165 A1* | 5/2003 | Warren ............ G06F 17/30716 |
| 2006/0053372 A1* | 3/2006 | Adkins ................... G09B 7/02 |
| | | 715/709 |
| 2007/0122789 A1* | 5/2007 | Yoo ........................ G09B 7/00 |
| | | 434/323 |
| 2009/0172534 A1* | 7/2009 | Budreau ............ G06F 3/04895 |
| | | 715/704 |
| 2014/0298162 A1* | 10/2014 | Cohen ..................... G09B 5/02 |
| | | 715/234 |
| 2015/0058734 A1 | 2/2015 | Ward |
| 2015/0227276 A1* | 8/2015 | Batti .................. G06F 17/2247 |
| | | 715/235 |

OTHER PUBLICATIONS

Forster, K. et al., "HTML5 Guidelines for Web Developers", Jun. 30, 2011, Addison-Wesley Professional, p. 277.*

* cited by examiner

*Primary Examiner* — Stella Higgs
(74) *Attorney, Agent, or Firm* — Chad Peterson

(57) ABSTRACT

Provided are systems and methods for creating and playing back live help routines for websites. During creation of a live help routine, the user performs actions on the website, and information about the user's actions and the website elements being interacted with are automatically stored. In addition, screenshots and HTML of the target website may be stored. The stored information about the website elements may include properties, attributes, and other identifying information regarding the target elements. Upon execution of the stored live help routine, the user viewing the live help routine is guided through the steps by highlighting on the live website the target element that the user need to interact with. The target element is found by matching all or part of the stored information about the website elements with the properties, attributes, and other information of the elements of the live website.

13 Claims, 11 Drawing Sheets

SYSTEMS AND METHODS FOR GUIDED LIVE HELP

BACKGROUND OF THE INVENTION

Methods for creating tutorials for web applications or websites are known. One method is for the tutorial creator to capture the operation of the web application or website in a video format. These video tutorials are often posted on the internet, e.g., on youtube.com. However, once one of these video tutorials is created, it is difficult to easily modify the tutorial. Editing a video tutorial is a time-consuming process. Furthermore, if the target website changes its layout or is otherwise modified, the video tutorial may no longer accurately reflect the website, leading to a confusing experience for the viewer of the tutorial. In this situation, the video tutorial may need to be completely recreated.

Other methods for creating tutorials, such as manually taking screenshots and compiling them into a list of directions, are equally cumbersome and difficult to modify when necessary. If the target website changes its layout or is otherwise modified, new screenshots will need to be captured and manually inserted into the tutorial.

BRIEF SUMMARY OF THE INVENTION

The present invention addresses the above and other issues by providing a guided live help creation and initiation system and method. A user wanting to create a guided live help routine first starts the capture process. Then, as the user performs the steps of the routine, specific characteristics of the elements of the target website that the user interacts with may be stored as part of the live help routine. Additional information, such as screenshots or HTML of the target website may also be stored. When the user is finished with the steps of the routine, the live help routine is processed and saved to a database.

When the guided live help routine is initiated and played back by a user of the target website, the live help player guides the user through the steps of the live help routine. At each step, the live help player finds the target website element for that step and highlights it, indicating that the user needs to interact with that website element. The live help player is able to find the target website element even if the element has changed position or another characteristic in the live website. If the user interacts with the target website element correctly, the live help player proceeds to the next step of the live help routine. If the user fails to correctly interact with the target website element, an indication of this is given to the user, and the user is allowed another opportunity to correctly interact with the target website element. This proceeds until the user has finished the live help routine.

In one aspect, the invention is directed towards a computer-implemented method of creating a live help routine for a website, comprising: monitoring a user's interaction with the website, the website comprising at least one element; detecting an event related to the user's interaction with the website; capturing the event; determining a website element related to the event; and creating a step of the live help routine, the step comprising an abstract representation of the element related to the event.

Implementations of the invention may include one or more of the following. The abstract representation may comprise at least one property or attribute of the element. The at least one property may be an id property. The at least one property may be a class property. The abstract representation may comprise a computed characteristic of the element. The created live help routine step may comprise a screenshot or automatically generated text. The method may further comprise storing the live help routine in a database.

In another aspect, the invention is directed towards a computer-implemented method of guiding a user to perform an action on a website, comprising: retrieving a step of a live help routine, the step comprising an abstract representation of a website element associated with the step; inspecting characteristics of at least one element of the website; finding an element of the website that matches the abstract representation associated with the step; and highlighting the found element.

Implementations of the invention may include one or more of the following. The method may further comprise listening for user interaction with the found element; and upon detecting user interaction with the found element, determining if the step was correctly completed by the user. The abstract representation may comprise at least one property or attribute of the element. The at least one property may be an id property. The at least one property may be a class property. The at least one property may be a text content property. The finding may further comprise matching part of the abstract representation with at least one property or attribute of an element of the website. The abstract representation may comprise a class list, and the finding may further comprise matching part of the class list of the abstract representation with a class list of an element of the website.

In yet another aspect, the invention is directed towards a server for storing live help routines for websites, the server comprising: a database configured to store a live help routine for a website, the live help routine comprising at least one step, the step comprising an abstract representation of an element of the website, wherein the abstract representation is used while executing the live help routine to identify the element on the live website.

Implementations of the invention may include one or more of the following. The abstract representation may comprise at least one property or attribute of the element. The at least one property may be an id property. The at least one property may be a class property. The abstract representation may comprise a computed characteristic of the element.

BRIEF DESCRIPTION OF DRAWINGS

Embodiments are illustrated by way of example and not limitation in the figures of the accompanying drawings, in which like references indicate similar elements and in which.

DETAILED DESCRIPTION OF THE INVENTION

Figure 1:
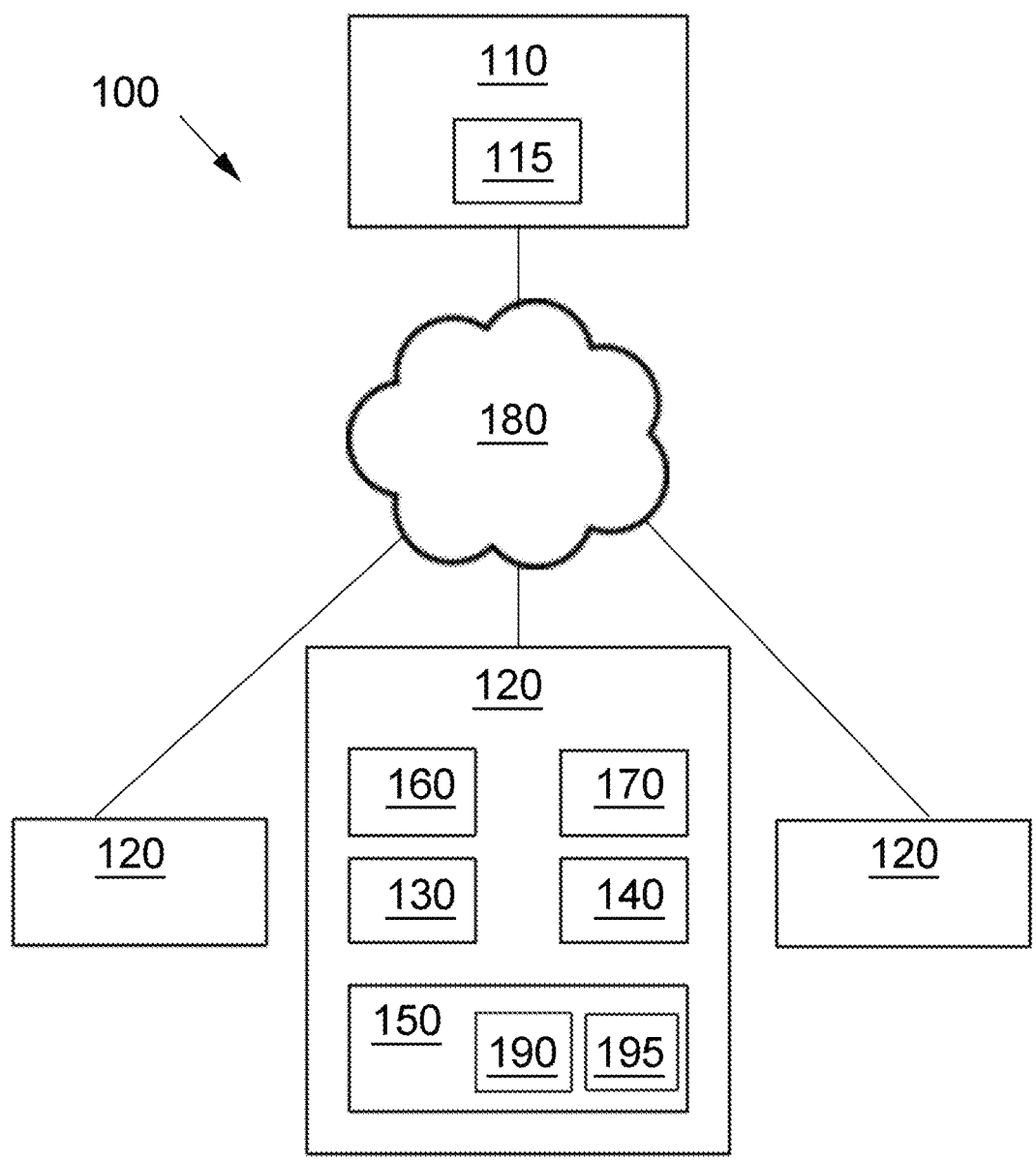
FIG. 1 illustrates an example architecture in which a guided live help system according to the principles of the present disclosure may be implemented.

The following detailed description includes references to the accompanying drawings, which form a part of the detailed description. The drawings show illustrations in accordance with example embodiments.

Using the systems and methods described herein, users can create web-based live help routines that provide detailed instructions regarding how to perform a specific activity on a website. The web-based live help is customizable and editable after it is recorded. In addition, the created live help routines are adaptable to changes in the target website.

The live help application is described below as an extension to the web browser, but it may also be a stand-alone application or a plug-in application.

A live help creator may want to create live help teaching other users how to retrieve a stock quote from yahoo.com. To create the live help routine, the live help creator installs the live help browser extension, then selects "Capture" to start the capture process. The live help creator then performs the steps necessary to retrieve the stock quote, e.g., he clicks on the stock quote page, selects the proper text box, enters the stock's ticker symbol, then clicks on the "Go" button. As the live help creator is performing the steps, information about the website elements being interacted with, as well as screenshots and HTML of the target web page, are saved. After the live help creator has finished performing the steps necessary to create the live help routine, the finished live help routine is stored on a server. After the live help routine is created and stored, other users, e.g., users browsing yahoo.com, can retrieve the live help routine and follow the steps in the live help routine to learn how to retrieve a stock quote from yahoo.com.

In creating and running the live help routines, the present system makes use of Document Object Model (DOM) events, functions, properties, and attributes of the individual HTML elements of the website for which the live help routine is being created. The DOM is a platform and language-neutral interface that allows programs and scripts to dynamically access and update the content, structure, and style of a document. The DOM describes the organization and types of elements of a website. Using the DOM interface, elements of a website, such as the title, paragraphs, headings, forms, etc., can be accessed using a programming language such as JavaScript. For example, the getElementBy Id function can find an element by its id property. After accessing the element, methods of the element can be run and properties and attributes of the element can be retrieved or changed.

Each DOM element includes properties and attributes that describe the element. DOM properties include an id, one or more classes and other properties that are known to one of ordinary skill in the art. The id property uniquely identifies the element. The class property identifies zero or more classes that the element belongs to. Attributes include href, specifying a link, and alt, specifying alternative text for an image. The present system uses DOM properties and attributes of the element to identify the DOM elements that the live help creator interacts with, and later uses the same DOM properties and attributes to find the interacted-with DOM elements when a user is running the live help.

FIG. 1 illustrates an example architecture 100 in which a live help builder according to the principles of the present disclosure may be implemented. Architecture 100 comprises server 110, internet or other network 180, and one or more client devices 120. Server 110 comprises database 115, in which are stored completed live help routines for later retrieval by website users. Client devices 120 can be any type of device on which browsing a website is enabled, e.g., desktop computers, laptop computers, notebook computers, tablet devices, cellular phones, etc. Client devices 120 may comprise an operating system 130 and a web browser 140. The live help building and execution functions described herein may be implemented in a browser extension 150. Alternatively, the live help creation and execution functions may be implemented as a stand-alone application. One of ordinary skill in the art will recognize other possible implementations. Browser extension/stand-alone application 150 may include live help creation module 190 and live help execution module 195, which are described in more detail below in connection with FIGS. 2 through 10.

Client devices 120 may also include a live help editor 160 and a web player 170. The live help editor 160 allows for the user to edit live help after it has been created. The web player 170 allows for executing live help routines in a simulated environment. These applications will be described in further detail below.

Figure 2:
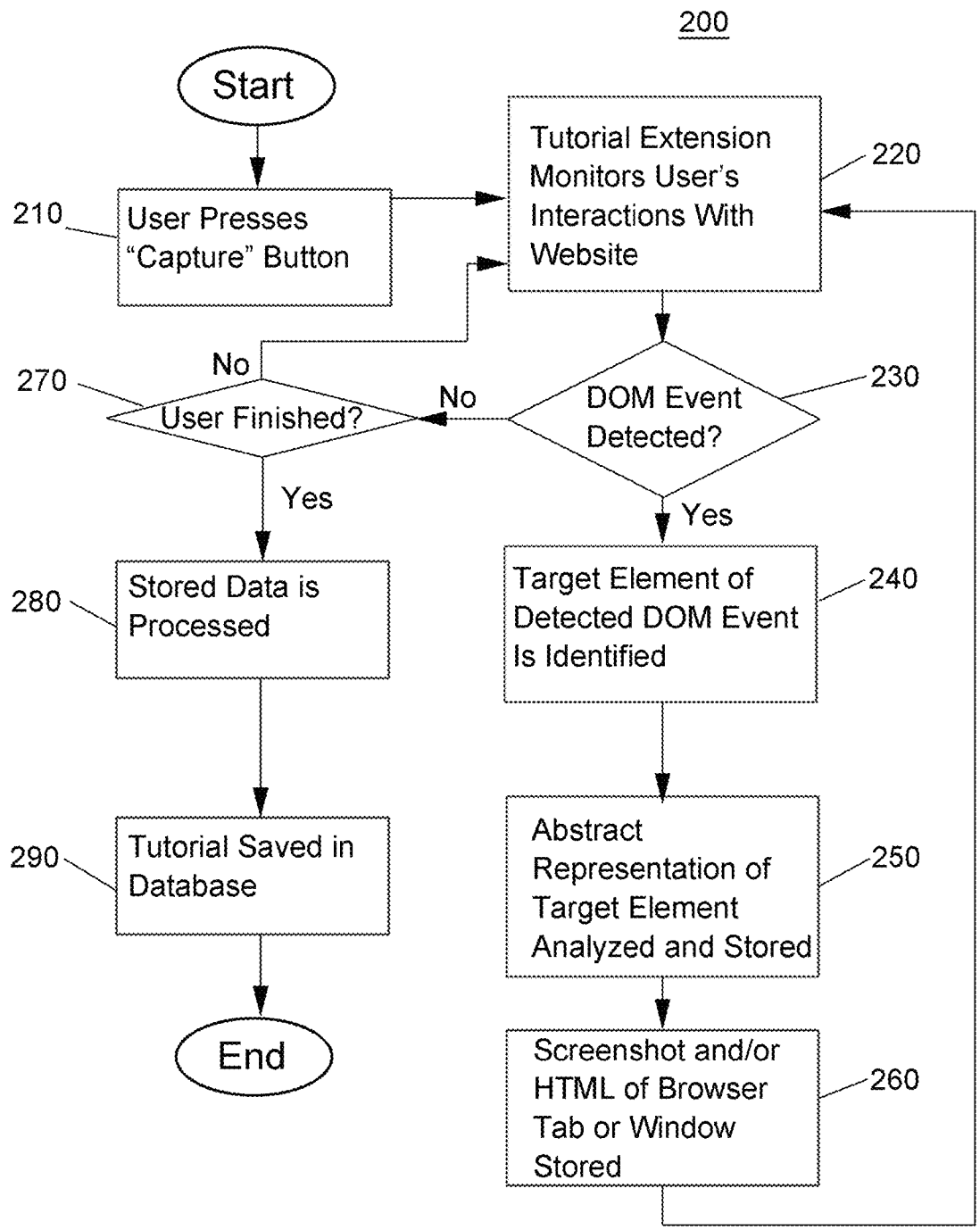
FIG. 2 illustrates an example method according to one aspect of the present invention.
Figure 4:
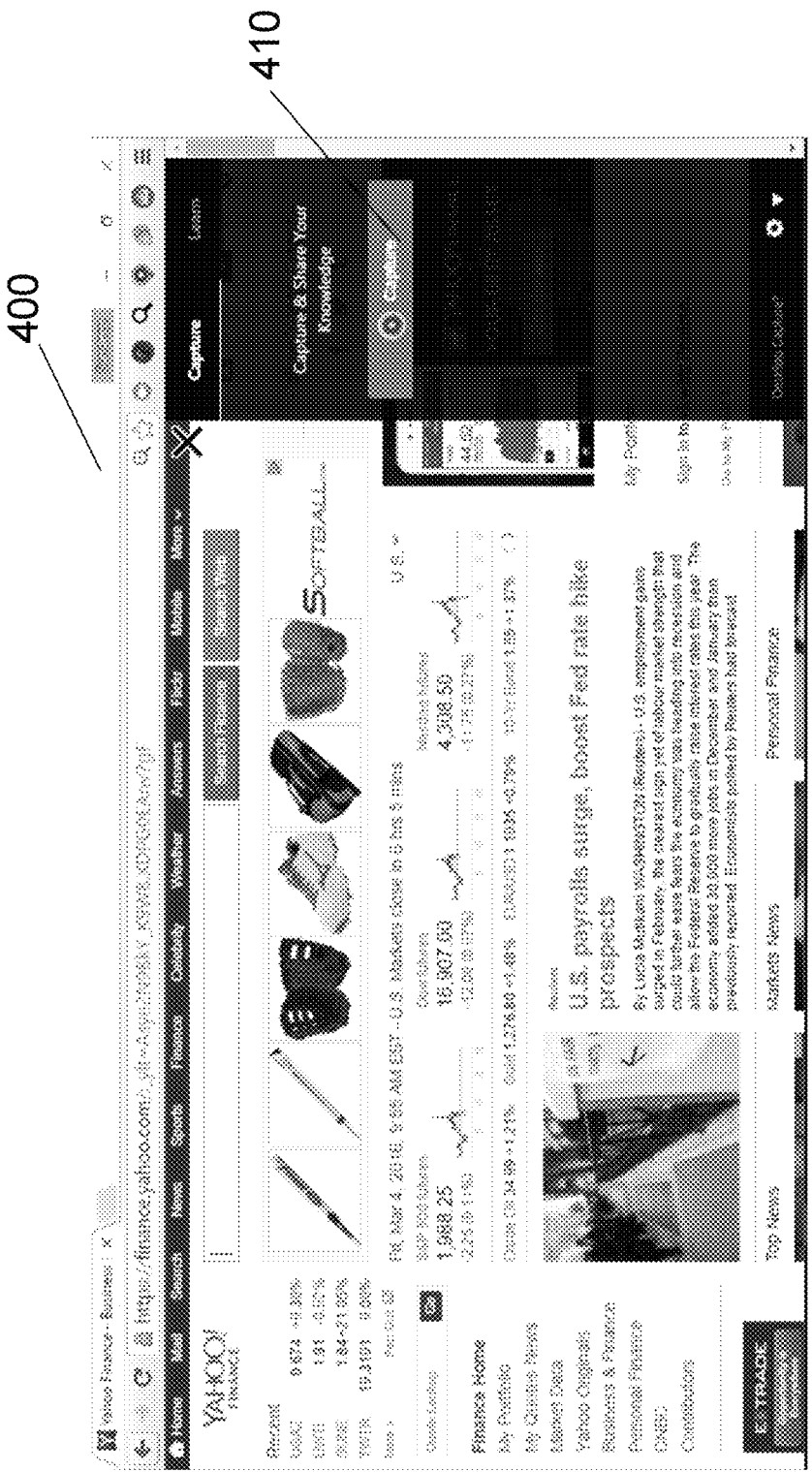
FIG. 4 illustrates an example screenshot according to one aspect of the present invention.

FIG. 2 illustrates an example method 200 for recording live help, and is one embodiment of live help creation module 190. In step 210, the user presses the Capture button, indicating that the user is ready to begin capturing live help steps. FIG. 4 shows an example screenshot 400 illustrating a possible implementation of this step, with Capture button 410. In step 220, the tutorial extension begins monitoring the user's interactions with the website. In one embodiment, the extension monitors DOM events that indicate the user has interacted with the website. For example, if the user clicks on a button, a DOM "onclick" event is triggered. The below table lists events that may be monitored and their corresponding user actions.

| DOM Event | Corresponding User Action |
| --- | --- |
| onclick | The user clicks on an element |
| oncontextmenu | The user right-clicks on an element to open a context menu |
| ondblclick | The user double-clicks on an element |
| onmousedown | The user presses a mouse button over an element |
| onmouseenter | The user moves the pointer onto an element |
| onmouseleave | The user moves the pointer out of an element |
| onmousemove | The user moves the pointer is moving while it is over an element |
| onmouseover | The user moves the pointer onto an element, or onto one of its children |
| onmouseout | The user moves the mouse pointer out of an element, or out of one of its children |
| onmouseup | The user releases a mouse button over an element |
| onkeydown | The user is pressing a key |
| onkeypress | The user presses a key |
| onkeyup | The user releases a key |
| onpageshow | The user navigates to a webpage |
| onpagehide | The user navigates away from a webpage |
| onscroll | The user scrolls an element's scrollbar |
| onblur | An element loses focus |
| onchange | The content of a form element, the selection, or the checked state has changed |

| DOM Event | Corresponding User Action |
| --- | --- |
| onfocus | An element gets focus |
| onfocusin | An element is about to get focus |
| onfocusout | An element is about to lose focus |
| oninput | An element gets user input |
| onreset | A form is reset |
| onsearch | The user types in a search field |
| onselect | The user selects text |
| onsubmit | A form is submitted |
| ondrag | The user is dragging an element |
| ondragend | The user has finished dragging an element |
| ondragenter | The dragged element enters the drop target |
| ondragleave | The dragged element leaves the drop target |
| ondragover | The dragged element is over the drop target |
| ondragstart | The user starts to drag an element |
| ondrop | The user drops the dragged element on the drop target |
| onwheel | The user rolls the mouse wheel up or down over an element |
| ontouchcancel | The touch is interrupted |
| ontouchend | The user removes a finger from a touch screen |
| ontouchmove | The user drags a finger across a touch screen |
| ontouchstart | The user places a finger on a touch screen |

The above table lists examples of the types of DOM events that may be monitored by the live help extension, and is not intended to be an exclusive list. Other DOM events may be monitored. Furthermore, future implementations of DOM may remove or add to the events listed above, and all present and future DOM events that indicate a user's interaction with the website are within the scope of the present disclosure.

The extension may listen for DOM events in any opened tab or window. The extension also may keep track of newly opened windows and tabs so those can be monitored. In one embodiment, DOM events are monitored by adding a global event listener to the window. In an alternative embodiment, events may be monitored by adding event listeners to individual website elements.

In step 230, the extension determines if a DOM event has been detected. For example, if the user clicks on a button, the "onclick" DOM event may be detected. If a DOM event has been detected, in step 240, the target element of the detected DOM event is identified. When a DOM event is detected, a DOM event object is passed to the event handler. The DOM event object includes details regarding the element that was the target of the user interaction. For example, if the user clicked on a button, the DOM event object includes a reference to the button that the user clicked on.

In step 250, DOM properties and attributes of the target element are analyzed and stored. In the DOM model, each element of the website has properties and attributes which describe the element. All elements include properties such as id (a unique identifier for the element), classList (a list of classes that apply to the element), and innerHTML (the HTML content of the element). A button element also includes properties such as disabled, indicating whether or not the button is disabled. The below table lists DOM properties and attributes that may be stored and their corresponding description.

| Property or Attribute | Description |
| --- | --- |
| classList | A list of class names |
| className | A string containing class names |
| clientHeight | The viewable height of the element |
| clientLeft | The width of the left border of the element |
| clientTop | The width of the top border of the element |
| clientWidth | The viewable width of the element |
| id | The unique id of the element |
| innerHTML | The HTML content of the element |
| lang | The language code of the element |
| nodeName | The name of the node |
| nodeType | The type of the node |
| nodeValue | The value of the node |
| offsetHeight | The height of the element including padding, border, and scrollbar |
| offsetWidth | The width of the element including padding, border, and scrollbar |
| offsetLeft | The horizontal offset position of the element |
| offsetParent | The offset container of the element |
| offsetTop | The vertical offset position of the element |
| scrollHeight | The height of the element including padding |
| scrollWidth | The width of the element including padding |
| style | The CSS style of the element |
| tagName | The tag name of the element |
| textContent | The text content of the element and its descendants |
| title | The title of the element, for a tooltip |
| alt | Specifies an alternative text for an image |
| href | Specifies the URL for a link |
| src | Specifies the URL for an image |
| value | Specifies the value of an element |

The above table lists examples of the types of DOM properties and attributes that may be stored by the live help extension, and is not intended to be an exclusive list. Other DOM properties or attributes may be stored. For example, properties or attributes specific to a particular type of DOM object may be stored, e.g., the href property of an a (anchor) element or the name property of a textarea element. Furthermore, future implementations of DOM may remove or add to the properties and attributes listed above, and it is contemplated that the present invention encompasses all present and future DOM properties and attributes that may be used to describe a particular element of the website.

In one example embodiment, the tagName, id, classList, and textContent properties are stored, along with the href, src, and alt attributes. Other combinations of properties and attributes may also be stored.

In addition to the properties and attributes listed above, certain other information regarding the element may stored. As used in the present specification, "information" about an element includes any and all data that relates to the element, including, but not limited to, properties, attributes, and data returned by a function call related to the element (e.g., getComputedStyle, getBoundingClientRect, etc.). The style of the element may be stored. For example, a call to the getComputedStyle JavaScript function returns the style actually used in displaying the element. Style properties returned from this function call and stored may include color, background-color, font-size, font-weight, and font-family, among others.

The bounds of the element may be stored. For example a call to the getBoundingClientRect JavaScript function returns the size of the element and its position with respect to the viewport. Other bounds, such as screen bounds and tab bounds (as opposed to the viewport bounds returned by getBoundingClientRect) may also be used. The screen bounds are bounds relative to the screen, taking into consideration the start position of the tab, the page zoom factor, the device pixel ratio, and the location of the element e.g., whether or not inside an iframe. The tab bounds are screen bounds relative to the start position of the tab.

The name of the element may be stored. The name of the element is not a specific property or attribute of the element, but instead is computed by an algorithm of the extension. The name of the element is determined based on the characteristics of element. For example, a "select" element's name may be the label of one of the options. If the "aria-label" or "aria-labelledby" attributes of the element are set, the name may be the associated string. If the element has a corresponding "label" element, the name may be the label name. If the element has a defined "placeholder" attribute, the name may be the value of the "placeholder" attribute. If the element is a password input, the name may be the id of the element. If none of the above apply, the name may be the element's value property or the element's textContent property, whichever is set. In essence, the name of the element is the most appropriate identifying text associated with the element.

The type of the element may be stored. The type of the element is not a property or attribute of the element, but instead is computed by an algorithm of the extension. The type of the element may be determined from the element's class list, e.g., if the element has 'btn' or 'button' as a class, the element is given the type BUTTON. The type may also be determined from the element's tag. For example, the "a" tag is given the type LINK. Multiple tags may be given the same type, e.g., the "img," "svg," and "canvas" tags may be given the type IMAGE.

In addition, in step 250, certain specifics of the detected DOM event may be stored. For example, if the DOM event is "onclick," the specific mouse button, e.g., left middle, right, etc., may also be stored. This information may be retrieved from the DOM event object. The url of the browser tab from which the DOM event originated is also stored.

Thus, step 250 stores an abstract representation of the DOM event and the targeted DOM element. This enables the live help extension to find the targeted element on execution of the live help routine even if certain properties, such as positioning, have been changed on the live website.

In step 260, a screenshot of the browser tab or window from which the captured DOM event originated may be captured and stored. Alternatively, part or all of the HTML of the tab or window from which the captured DOM event originated may be captured and stored. The stored screenshot and/or HTML is then associated with the abstract representation of the DOM event and element. As an additional alternative, automatically generated text that describes the action that should be taken may be created and stored.

Processing then returns to step 220, to continue monitoring the user's interactions with the website.

Returning to step 230, if a DOM event is not detected, the method proceeds to step 270, where it is determined if the user is finished recording, e.g., by clicking an extension button indicating that the user is finished creating the live help, e.g., a "finished" button. If the user is not finished, processing continues at step 220. If the user has indicated that he is finished recording the live help, processing continues at step 280.

In step 280, the stored data may be processed. This processing may include discarding, merging, or modifying the stored events, properties, attributes, other identifying characteristics, screenshots, and/or HTML to create a series of individual steps for the live help. If screenshots were captured, consecutive screenshots may be compared, and a difference frame created to minimize storage and retrieval time.

In step 290, the live help steps are sent to server 110 and stored. The screenshots and frames are also sent to server 110 and stored. The method of storage may be a database or a file system. As an alternative, cloud storage may be used.

Figure 5:
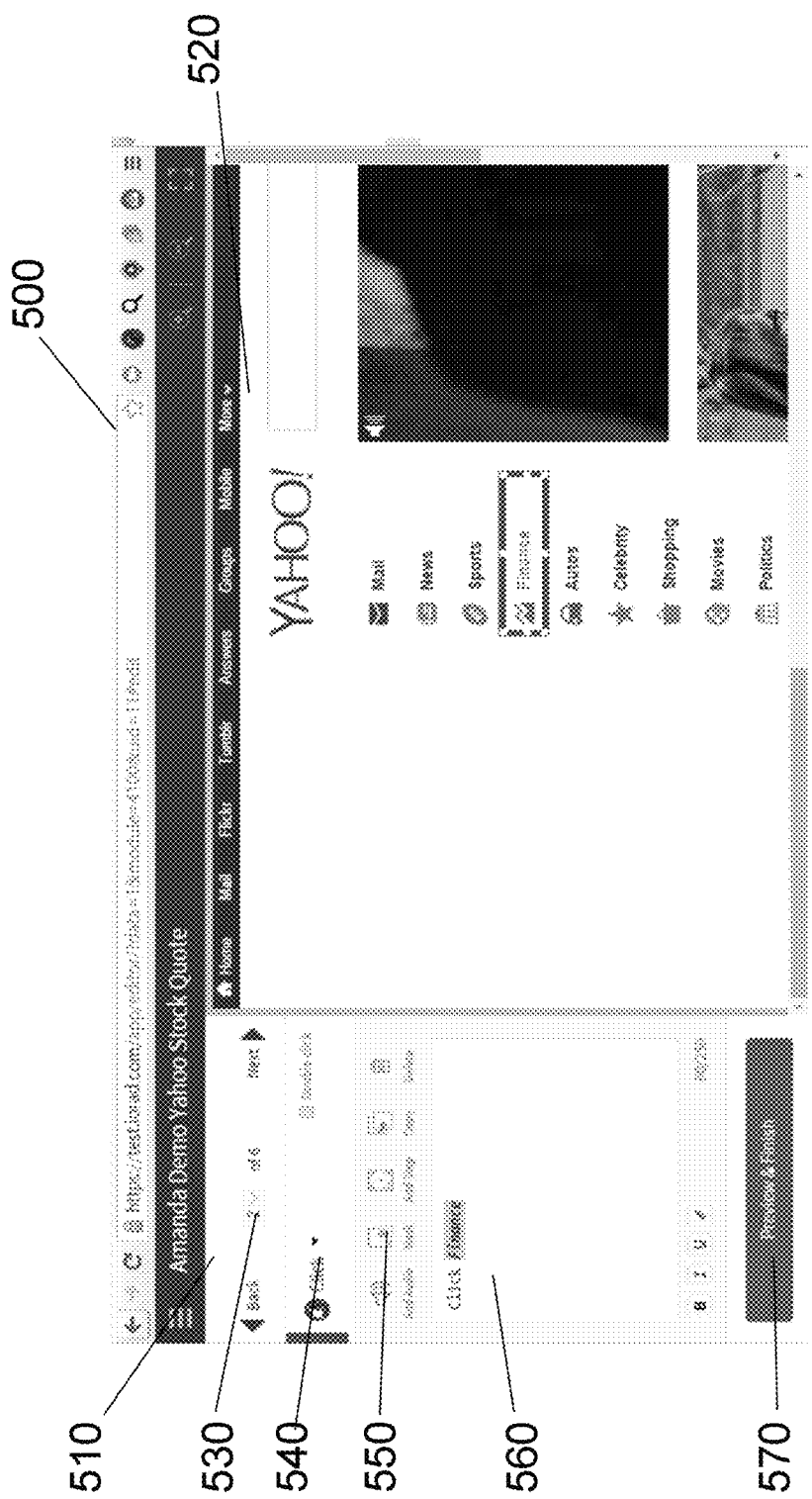
FIG. 5 illustrates an example screenshot according to one aspect of the present invention.

After the live help routine has been created and stored on server 110, the live help editor 160 may be used to edit and add to the steps of the live help routine. Live help editor 160 may be a stand-alone application, or may be integrated into browser extension 150. Using the live help editor 160, the user can Modify autogenerated text descriptions
Add, delete, and change captured steps
Set privacy options for the live help, e.g., public, unlisted, embed only, or private invite
Customize branding & player layout
Mask private data in screenshots with the pixelation tool
Add audio to the live help steps FIG. 5 illustrates a screenshot 500 of an embodiment of live help editor 160. Left frame 510 shows information about the currently viewed live help step. Right frame 520 shows what the live help viewer will see when performing that step of the tutorial. Left frame 510 comprises step selector 530, action editor 540, icon bar 550, text editor 560, and finish button 570. Step selector 530 allows the user editing the live help to go to the step that the user wants to edit. Action editor 540 allows the user to change the expected user interaction. Icon bar 550 allows the user to add audio for this step; mask parts of the screenshot, if the screenshot includes sensitive data such as account information; and add or delete steps. Text editor 560 allows the user to change the autogenerated text that is displayed to the live help viewer. When the user is finished editing the live help steps, finish button 570 may be clicked, and editor 160 may display a settings window, an example of which is illustrated in the screenshot 600 of FIG. 6.

Figure 6:
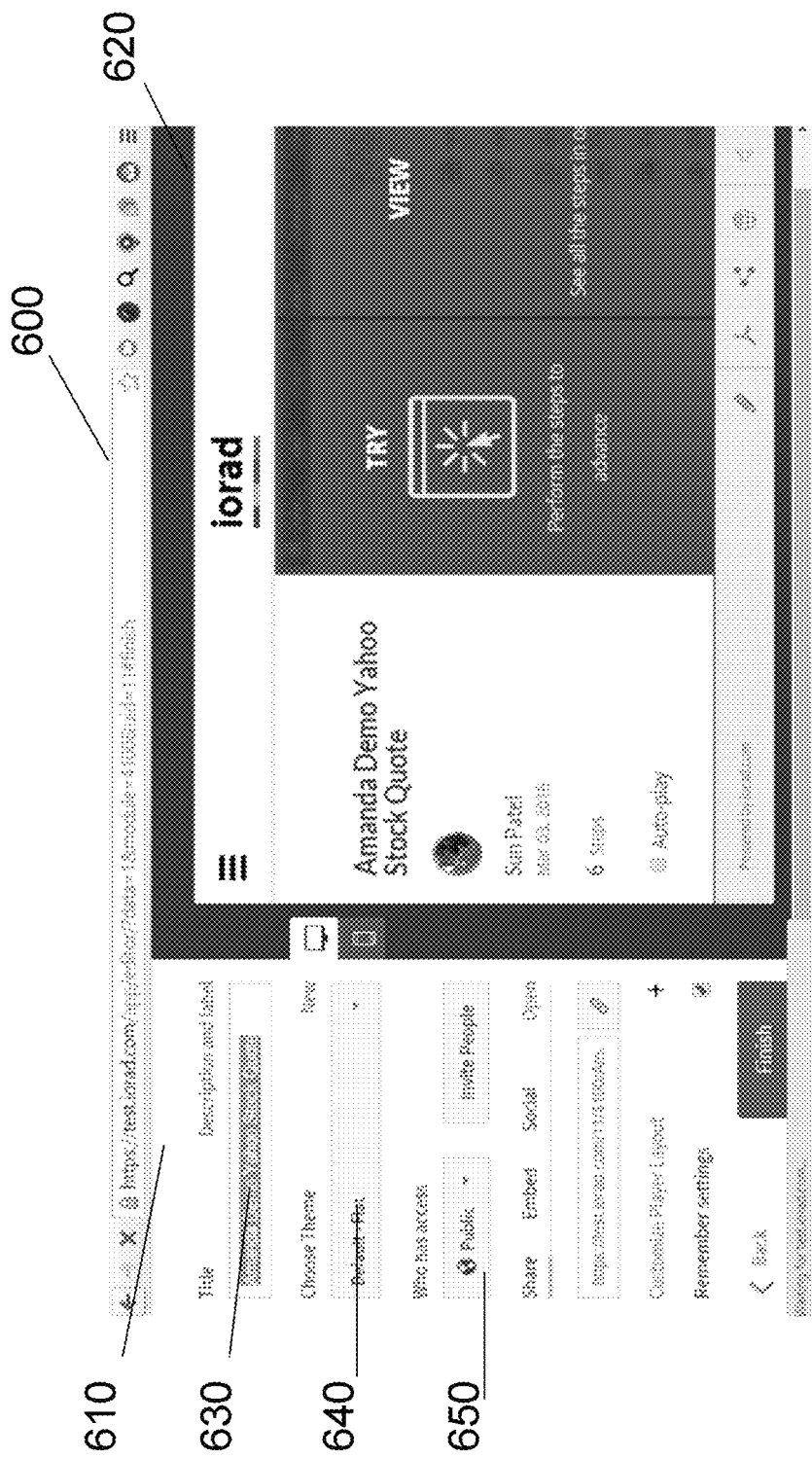
FIG. 6 illustrates an example screenshot according to one aspect of the present invention.

FIG. 6 comprises left frame 610, which displays and allows editing of certain settings, and right frame 620, which displays an information window. Left frame 610 comprises title editor 630, which allows the user to edit the title of the live help, theme selector 640, which allows the user to customize the visual theme of the live help, and permission selector 650, which allows the user to set view permission, such as public, unlisted, invitation only, etc.

Figure 3:
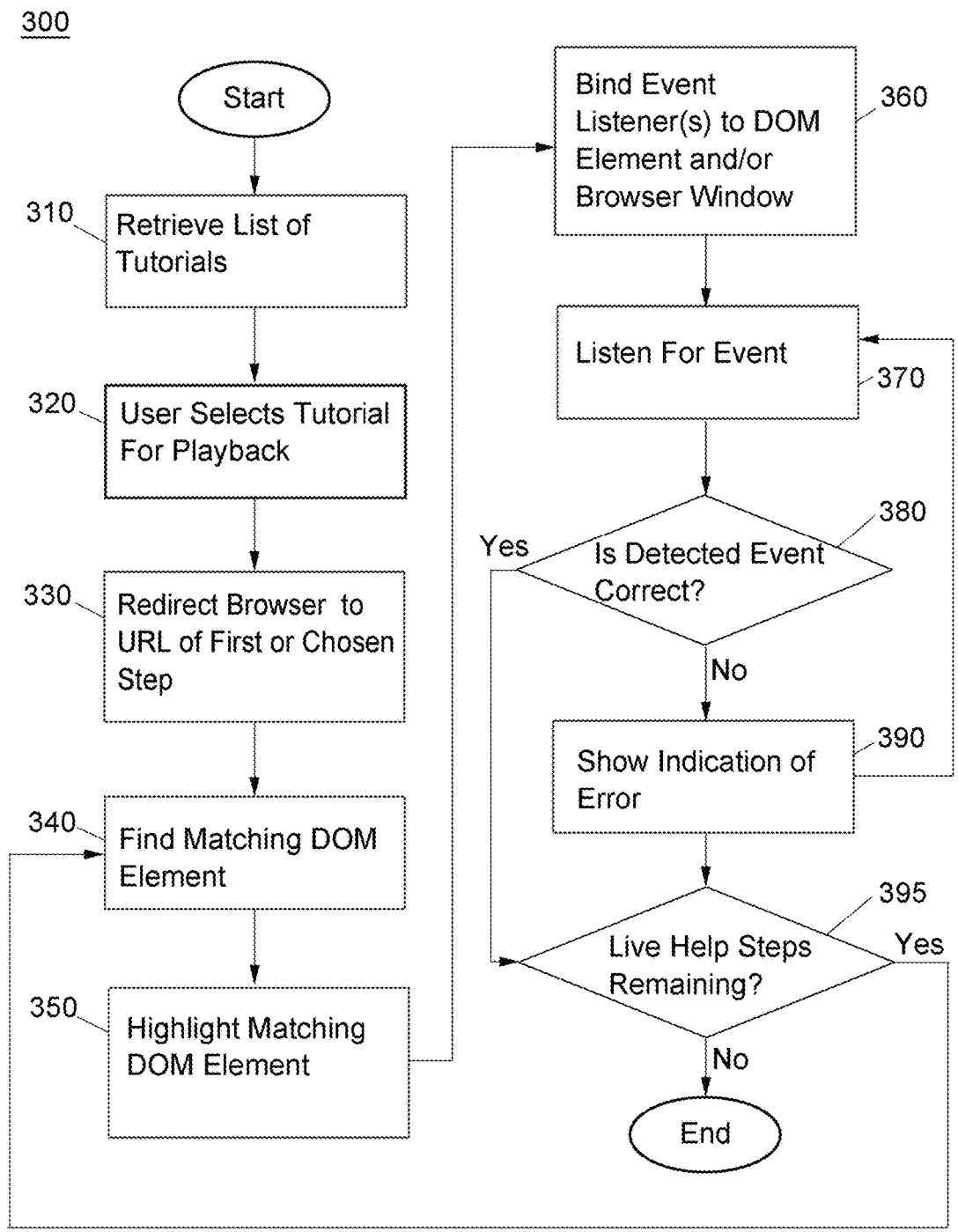
FIG. 3 illustrates an example method according to one aspect of the present invention.

FIG. 3 illustrates an example method 300 of running live help in a live environment, i.e., while the user is interacting with the live website, and is one embodiment of live help execution module 195 In step 310, the live help extension retrieves a list of live help routines from the server 110. The extension may automatically retrieve a list of live help routines for the currently opened website, e.g., upon start up. Alternatively, the extension may retrieve a list of live help routines in response to user input, such as a search term. The search term may be, e.g., a keyword or the name of a live help creator. As a further alternative, the user may click on a tab or button, such as a "Learn" tab, to prompt the live help extension to retrieve all public live help routines that have been captured on the current website.

Figure 7:
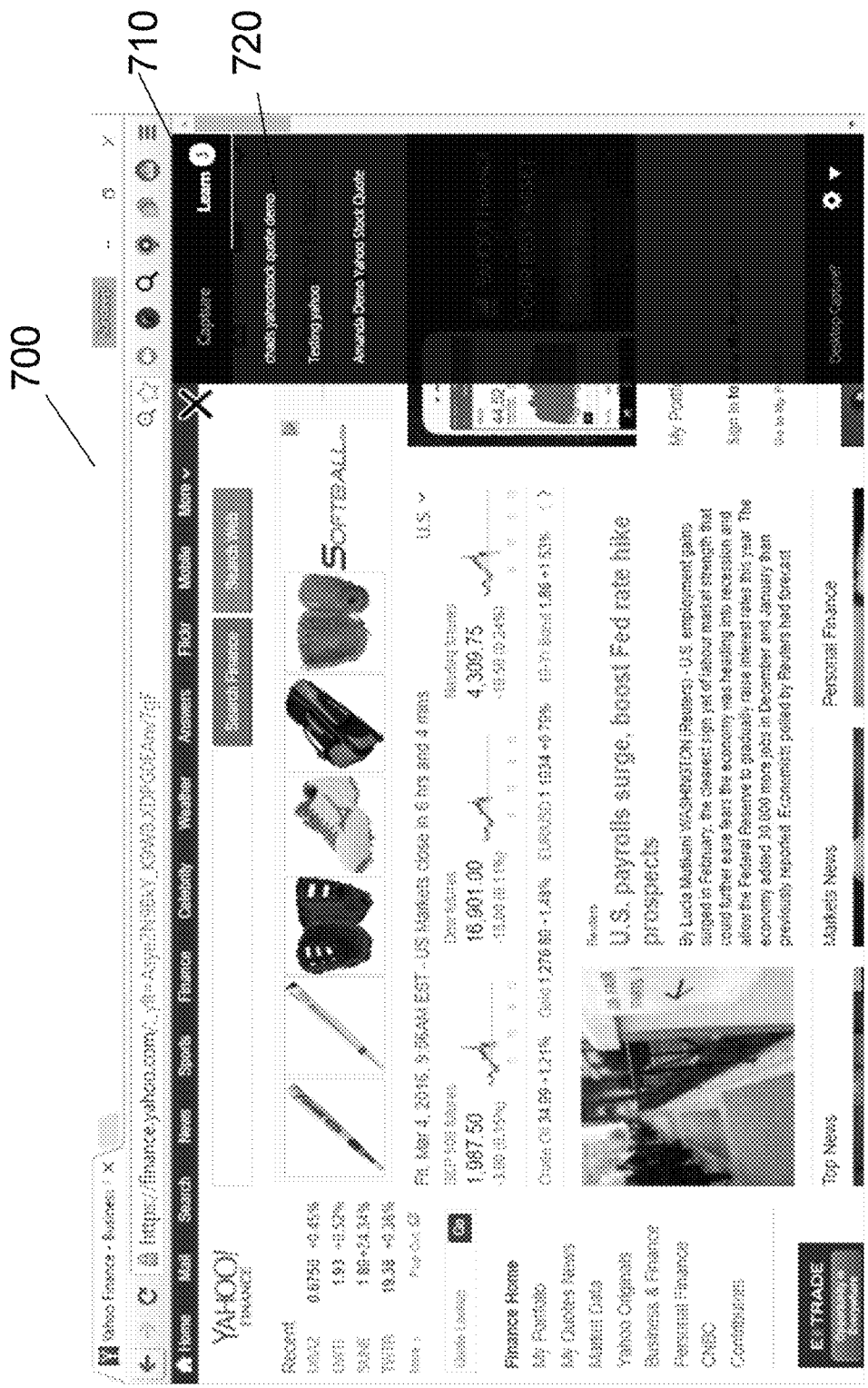
FIG. 7 illustrates an example screenshot according to one aspect of the present invention.

FIG. 7 illustrates an example screenshot 700 showing a possible implementation of this step. In FIG. 7, the user has selected "Learn" tab 710, and the live help extension has displayed live help list 720, which the tutorial extension has retrieved from the server 110. The live help routines are selected based on the url of the website the user is currently on.

Figure 8:
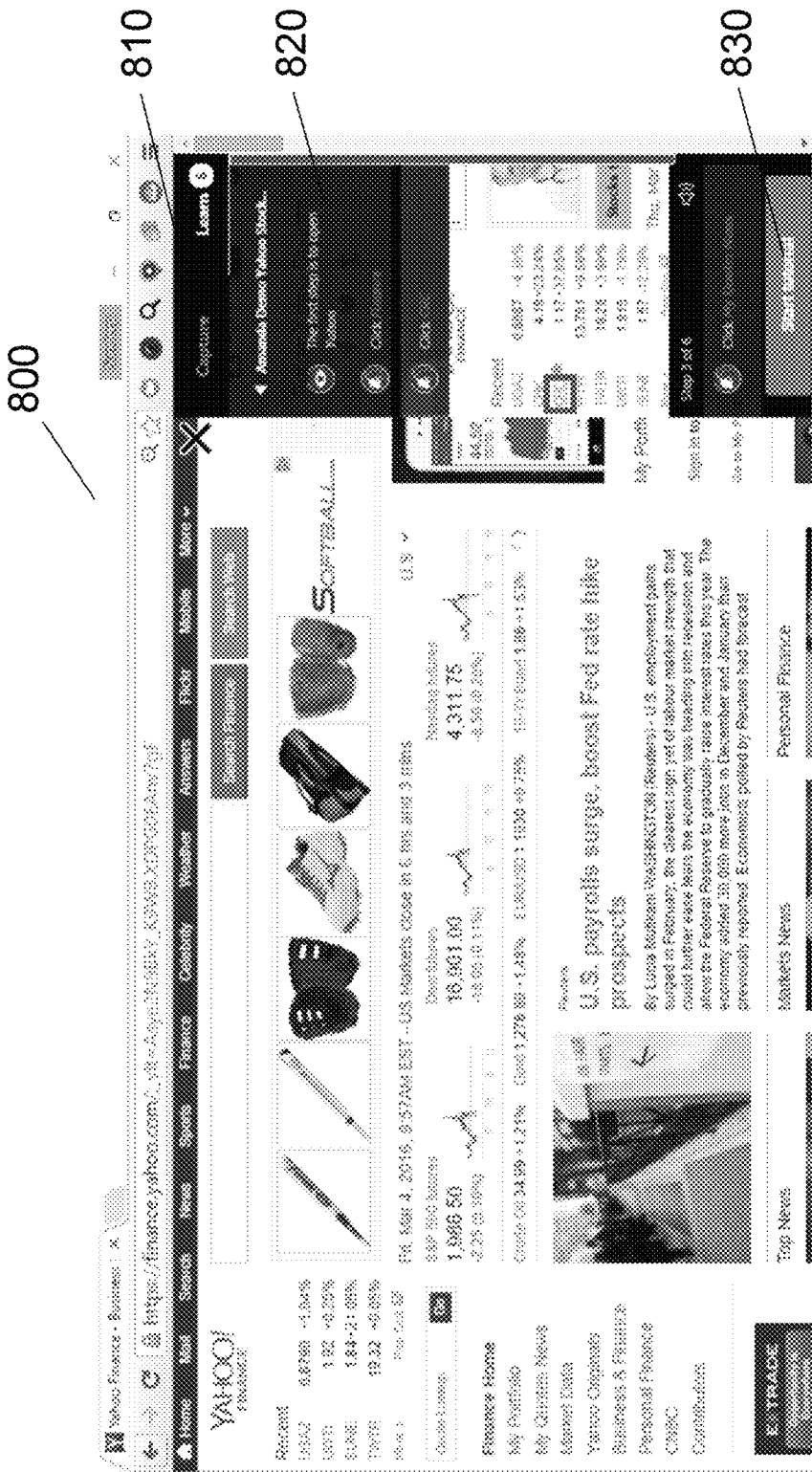
FIG. 8 illustrates an example screenshot according to one aspect of the present invention.

In step 320, the user selects a live help routine and the live help routine is retrieved from the server 110. The user can choose to start the live help from the beginning, or at any step of the routine. FIG. 8 illustrates an example screenshot 800 showing a possible implementation of step 320. Right frame 810 comprises live help step list 820 and start button 830. The user may select the starting live help step in live help step list 820 prior to clicking start button 830.

In step 330, the live help extension redirects the current browser tab to the url of the first live help step (or of the live help step the user chose to start the live help from).

In step 340, the live help extension finds the live website element matching the element information stored during capture of the current step of the live help.

The matching live website element may be found in a number of ways. For example, if a live website element matches a subset of the stored information, it may be a match. Not all of the stored information needs to be used to identify the matching element. In one embodiment, the stored id, tagName, classList, href, src, and alt information are used to find a match. Other ways of matching include matching the id property and matching the entire class list or a subset of the stored class list. Other combinations of properties and/or attributes or other information may be used to find a match.

During the process of finding a matching website element, an element selector may be created based on the saved information. In one embodiment, the element selector is a CSS selector. After the element selector is created, the website is then queried using the element selector to find a list of possible matches. Other methods of finding possible matches may also be used, such as inspecting the attributes and properties of the website elements.

Furthermore, a matching website element may be found even if it is a user-specific element as opposed to a static element. For example, during capture of the live help routine, the live help creator may have been using a website with user-specific elements, such as Google Docs. In this situation, the captured information may include user-specific information. For example, if the live help creator clicks on a Google Docs file, the captured information may include the user-specific filename, in addition to an event or other information that indicates that a file was clicked on. In this case, and others like it, the live help extension can, during execution of the live help routine, find a matching website element that is a file, but is not the specific file that was clicked on during capture of the live help routine. The live help extension can recognize that the specific filename is not a property or attribute that should be selected for, and the specific filename. The same applies to other situations where the element information may include user-specific data.

If using a selector does not find any matching elements, a pixel comparison can be made. In one embodiment, the portion of the stored screenshot that corresponds to the target element is compared to the screen bitmap of the browser window. Contour or edge detection techniques may be used to find a matching area of the browser window. If a matching area of the browser window is found, the live website element that corresponds to the matching area of the browser window is determined to be the matching element. If the pixel comparison does not find a matching element, a warning message may be displayed to the user and the current live help step may be skipped.

If more than one matching element is found using one of the above matching methods, the text content of the found live elements may be compared to the stored text content of the target element to find a match. In one embodiment, the text content is the value of the textContent property, if it is set, and otherwise the value of the alt attribute.

In step 350, the live help extension highlights the found website element, e.g., by placing a CSS border around it. This can be accomplished by, e.g., selecting the element and adding a CSS border style to it. Other ways of highlighting the website element may be used, such as changing the element's background or text color, placing an animated border around the element, or placing an arrow on the screen pointing to the element. One of ordinary skill in the art will recognize other methods of highlighting the element.

The color of the CSS border or other highlight may depend on the expected user interaction with the element. For example, if the user is supposed to left click on the element, the CSS border or other highlight may be green. Other colors may be used. Possible expected user interactions include left and right clicks, scrolling, dragging and dropping, typing, and reading. Each of these interactions may be assigned a different color.

Figure 9:
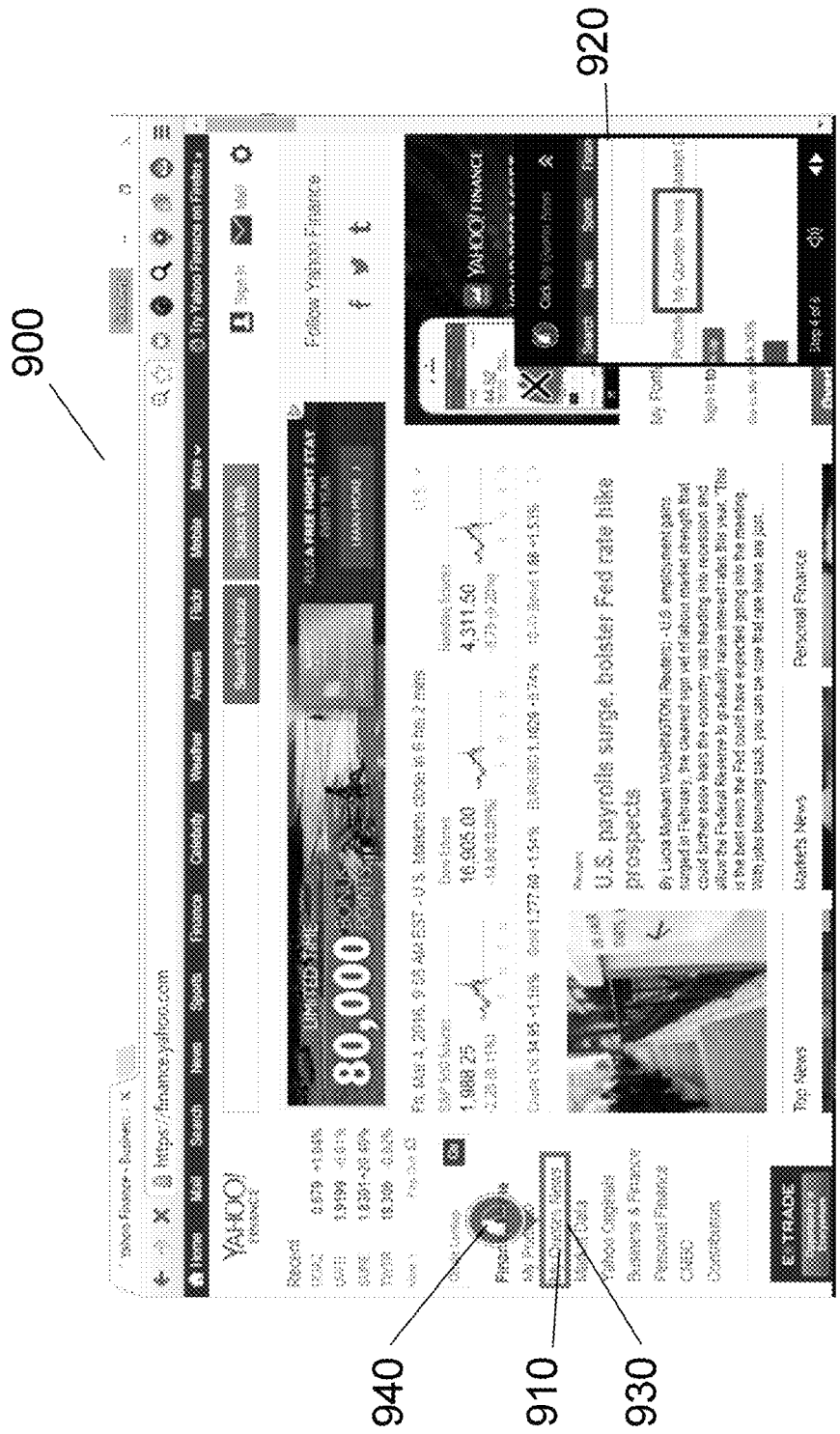
FIG. 9 illustrates an example screenshot according to one aspect of the present invention.

FIG. 9 illustrates an example screenshot 900 showing a possible implementation of step 350, showing that the user is supposed to click on the "My Quotes News" link 910. Pop-up window 920 shows what the user needs to do in this step of the live help routine, using the saved text and screenshot or HTML from the saved live help routine. If a matching element was found in step 340, it is highlighted on the live website tab. In FIG. 9, CSS border 930 has been placed around "My Quotes News" link 910. Left click icon 940 is also shown, instructing the user to left click on the link. Note that the position of the "My Quotes News" has changed since making the live help routine—when the live help was created, the link was below the search bar, but in the live window, the link is on the left side of the screen. In spite of this, the link was found and highlighted by the live help extension.

In step 360, one or more DOM event listeners may be bound to the website element to listen for user interaction with the element. In addition, a global event listener may be added to the web browser window to listen for user interaction outside the element. In step 370, the event listeners listen for one or more of the DOM events described above with respect to FIG. 2.

In step 380, one or more of the DOM event listeners detect a DOM event, and it is determined if the user performed the live help step correctly. This may be done, e.g., by comparing the detected DOM event with the stored event for this live help step. If the user did perform the live help step correctly, processing moves on to step 395, where it is determined if there are any live help steps remaining, and, if so, the method returns to step 340. If there are no live help steps remaining, the method ends.

If the user did not perform the live help step correctly, an indication of the user's error is generated in step 390, and processing returns to step 370, so the DOM event listeners can listen for the next user interaction. The error indication may take one of several forms, including changing the color of the CSS border, causing an audio cue to be played, animating the target element, animating an arrow pointing to the target element, etc.

Figure 10:
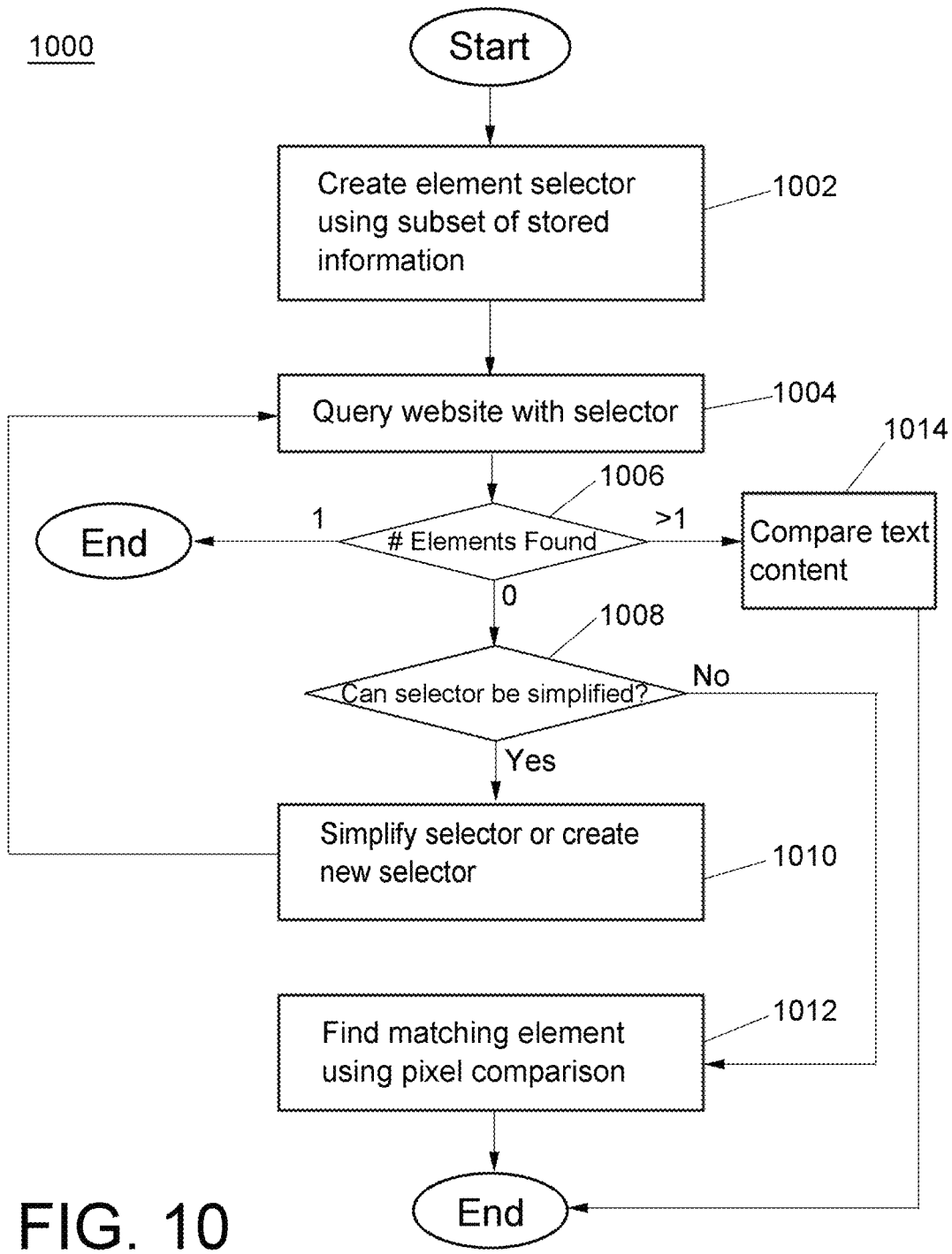
FIG. 10 illustrates an example method according to one aspect of the present invention

One embodiment of a method 1000 for implementing step 340 of FIG. 3 is illustrated in FIG. 10. In step 1002, an element selector is created that uses a subset of the stored DOM information associated with the current step of the guided help routine. For example, the element selector can be constructed that uses the stored id, tagName, classList, href, src, and alt information. Alternatively, the element selector can be constructed that uses a subset of the above-listed information.

In step 1004, the website is queried using the element selector created in step 1002 or step 1010 in an attempt to select a matching element. In step 1006, the number of matching elements is determined. If only one matching element is found, then the method 1000 ends and processing continues in step 350 of FIG. 3. If no matching elements are found, processing continues in step 1008. If more than one matching element is found, processing continues in step 1014.

In step 1008, it is determined if the element selector can be simplified. Simplifying the element selector can include, e.g., removing a constraint from the prior selector. For example, the stored id or tagName may be removed from the selector, if they are presently part of the selector. Alternatively, if a class list is presently part of the selector, one of the classes may be removed. The class to be removed may be the first class in the list, the last class in the list, or it may be chosen at random. As an alternative to removing a constraint from the current selector, a new, previously-unused selector may be created. For example, a selector containing only the id may be created, if such a selector has not previously been used. If the selector can be simplified, processing continues in step 1010. If the selector cannot be simplified, processing continues in step 1012. Note that not all possible selectors need to be tried before determining that the element selector cannot be simplified. In one embodiment, if iterating through the most frequently useful selectors does not result in a match, the method may determine that the element selector cannot be simplified and proceed to step 1012.

In step 1010, the selector is simplified as discussed above, and processing continues in step 1004.

In step 1012, a pixel comparison is performed to find a matching element. In one embodiment, the portion of the stored screenshot that corresponds to the target element is compared to the screen bitmap of the browser window. Contour or edge detection techniques may be used to find a matching area of the browser window. If a matching area of the browser window is found, the live web site element that corresponds to the matching area of the browser window is determined to be the matching element. Method 1000 then ends and processing returns to step 350 of FIG. 3. If no matches are found, a warning message may be displayed to the user and the current live help step may be skipped. Method 1000 then ends and processing returns to step 340 of FIG. 3.

In the case where the HTML of the target website was stored, an image of the screenshot the stored HTML would generate can be created using known techniques, and the created screenshot may then be used in a comparison instead of a stored screenshot.

In step 1014, for each of the matching elements, the stored text content is compared with the text content of the element. Is one embodiment, the text content of the element is either the value of the textContent property or the value of the alt attribute. If the textContent property is set, that value is used as the text content, otherwise the value of the alt attribute is used as the text content. If only one matching element is found after comparing the text content, then the method 1000 ends and the matching element is highlighted in step 350 of FIG. 3. If multiple matches are found when comparing the text content, a warning message may be displayed to the user and the current live help step may be skipped. Method 1000 then ends and processing returns to step 340 of FIG. 3.

The website element matching method 1000 described above enables the live help extension, upon running a live help routine, to find live website elements that match the stored element information, even if some of the properties, attributes, or positioning of the live website elements have changed.

Figure 11:
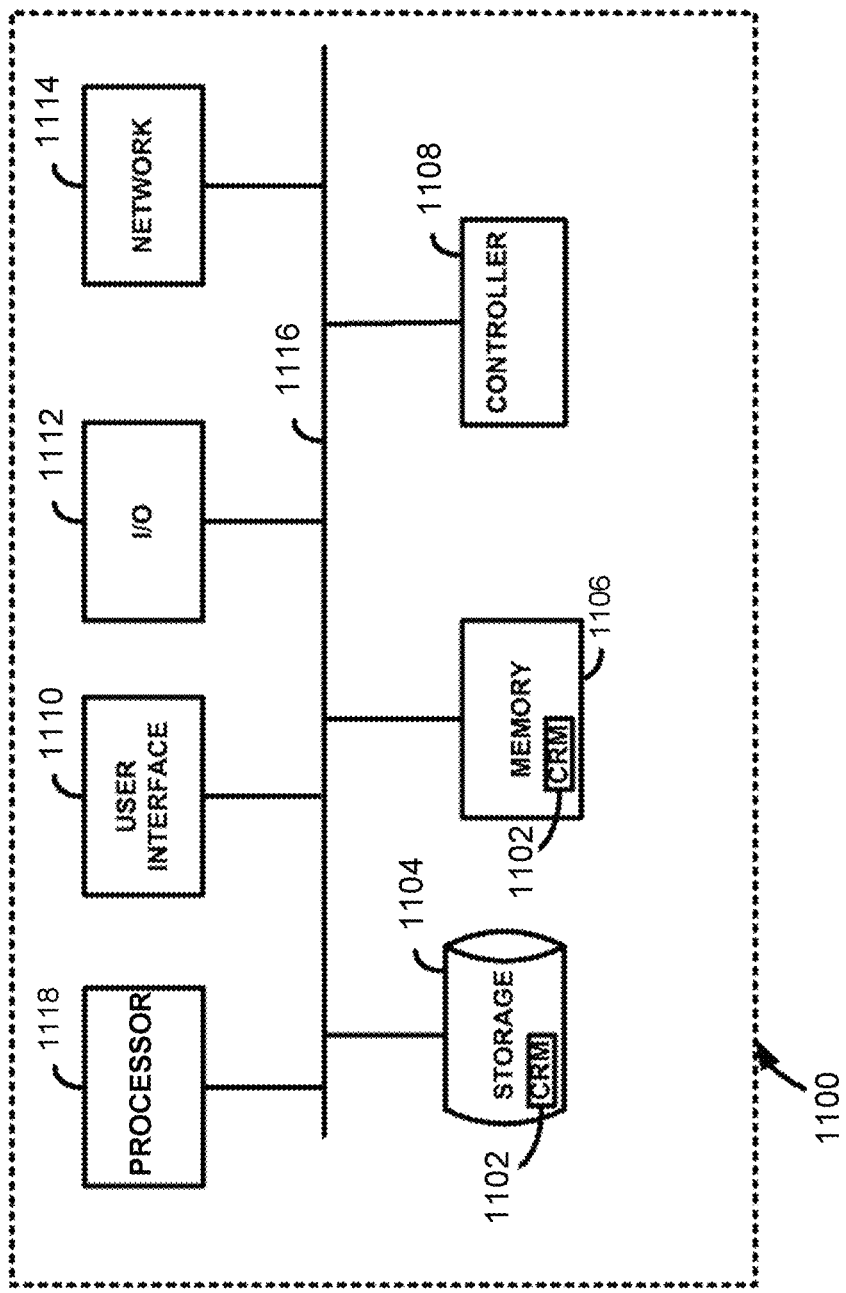
FIG. 11 illustrates an example computing environment according to one aspect of the present invention.

Player 170 is used to play back the live help routine in a non-live or practice environment. Player 170 may be a stand-alone application or may be integrated into live help browser extension 150. Player 170 can be operated in several different modes:

Try Steps Mode—An interactive simulated (non-live) mode, in which the user has to perform the action to advance to next step View Steps Mode—All the steps are presented in a pre-formatted table Mobile Mode—The user can swipe left/right through the steps PDF Mode—A client-side generated pdf with text and screenshot is presented The systems and methods may be fully implemented in any number of computing devices. An exemplary computing device 1100 on which server 110 and client devices 120 may be implemented is shown in FIG. 11. Typically, instructions are laid out on computer readable media 1102, generally non-transitory, and these instructions are sufficient to allow processor 1118 in the computing device to implement the methods of the invention. Processor 1118 may be a CPU, GPU, ASIC, or other processor capable of running the instructions. The computer readable medium may be a hard drive or solid state storage 1104 having instructions that, when run, are loaded into random access memory 1106. Inputs to the application, e.g., from a plurality of users or from any one user, may be by any number of appropriate controllers or computer input devices 1108. For example, users may employ a keyboard, mouse, touchscreen, joystick, trackpad, other pointing device, or any other such computer input device to input data. The outputs may be delivered to a user by way of a video graphics card or integrated graphics chipset (not shown) coupled to a display, including user interface 1110, that may be seen by a user. Computing device 1100 may also have any number of additional I/O devices 1112. Data may be input by way of an inserted memory chip, hard drive, flash drives, flash memory, optical media, magnetic media, or any other type of file—storing medium. Additionally, a printer may be employed to output hard copies of the results. Given this teaching, any number of other tangible outputs will also be understood to be contemplated by the invention. For example, outputs may be stored on a memory chip, hard drive, flash drives, flash memory, optical media, magnetic media, or any other type of output. Network interface 1114 may allow connections to a local network and/or an external network, including the internet. These components are interconnected by a common bus 1116. It should also be noted that the invention may be implemented on any number of different types of computing devices, e.g., personal computers, laptop computers, notebook computers, net book computers, handheld computers, personal digital assistants, mobile phones, smart phones, tablet computers, and also on devices specifically designed for these purposes. In one implementation, a user of a smart phone or wi-fi-connected device downloads a copy of the application to their device from a server using a wireless Internet connection. An appropriate authentication procedure and secure transaction process may provide for payment to be made to the seller. The application may download over the mobile connection, or over the WiFi or other wireless network connection. The application may then be run by the user. Such a networked system may provide a suitable computing environment for an implementation in which a plurality of users provide separate inputs to the system and method.

Although the invention has been described in terms of particular embodiments, one of ordinary skill in the art, in light of the teachings herein, will be able to generate additional embodiments and modifications without departing from the spirit of, or exceeding the scope of, the claimed invention. This invention is not limited to using the particular elements, materials, or components described herein, and other elements, materials, or components will be equivalent for the purposes of this invention. Accordingly, it is understood that the drawings and the descriptions herein are proffered only to facilitate comprehension of the invention and should not be construed to limit the scope thereof.

What is claimed is:

1. A computer-implemented method of guiding a user to perform an action on a website, the website comprising at least one element, comprising:
    monitoring a first user's interaction with the website;
    detecting an event related to the first user's interaction with the website;
    capturing the event;
    determining a website element related to the event;
    storing a step of a live help routine in a database, the step comprising an abstract representation of the element related to the event, the abstract representation including two or more of: classes from a class list, a Uniform Resource Locator (URL) for a link, and a URL for an image;
    in response to a second user selecting the live help routine, retrieving the step of the live help routine from the database;
    comparing at least part of the abstract representation with characteristics of at least one of the at least one element of the website to find an element of the website that matches the abstract representation associated with the step, by
        creating an element selector using at least part of the abstract representation, the element selector comprising at least two constraints taken from the abstract representation, the element selector comprising two or more of: classes from a class list, a URL for a link, and a URL for an image;
        querying the website for matching website elements using the element selector; and
        when querying the website using the element selector returns no matching website elements, recursively removing a constraint from the element selector to create a modified element selector and querying the website using the modified element selector until the query returns one or more matching website elements wherein the removed constraint comprises a class from a class list, a URL for a link, or a URL for an image; and
    modifying a cascading style sheet (CSS) property or CSS attribute of the website element to highlight the found element.

2. The method of step 1, further comprising:
    listening for user interaction with the found element; and
    upon detecting user interaction with the found element, determining if the step was correctly completed by the second user.

3. The method of claim 1, wherein the abstract representation comprises a displayed text content property.

4. The method of claim 1, wherein the determined web site element is a user-specific element, wherein the abstract representation comprises user-specific data related to the user-specific website element, and wherein the user-specific data is recognized as user-specific data and is not included as part of the element selector used to find the user-specific element in the comparing step.

5. The method of claim 1, wherein the website comprises HTML source code, wherein the stored step of the live help routine further comprises at least part of the HTML source code of the website, and further comprising the steps of:
    rendering the stored HTML source code to generate an image; and
    comparing the rendered image with a live image of the website to find a matching website element.

6. The method of claim 1, wherein the modification of the CSS property or CSS attribute further comprises adding a CSS border to the element.

7. The method of claim 6, wherein the color of the CSS border indicates the type of action the second user should perform with respect to the highlighted element.

8. A system for running live help routines for websites, the system comprising:
    a database configured to store a live help routine for a website, the website comprising at least one element, the live help routine comprising at least one step, the step comprising an abstract representation of an element of the website;
    a server comprising a processor and a memory, the memory storing instructions which, when executed by the processor, cause the server to perform the operations of:
        monitoring a first user's interaction with the website;
        detecting an event related to the first user's interaction with the website;
        capturing the event;
        determining a website element related to the event;
        storing a step of a live help routine in the database, the step comprising an abstract representation of the element related to the event and the type of event, the abstract representation comprising two or more of: classes from a class list, a Uniform Resource Locator (URL) for a link, and a URL for an image;
        in response to a second user selecting the live help routine, retrieving the step of the live help routine from the database;
        comparing at least part of the abstract representation with the characteristics of at least one of the at least one element of the website to find an element of the website that matches the abstract representation associated with the step, by
            creating an element selector using at least part of the abstract representation, the element selector comprising at least two constraints taken from the abstract representation, the element selector comprising two or more of: classes from a class list, a URL for a link, and a URL for an image;
            querying the website for matching website elements using the element selector; and when querying the website using the element selector returns no matching website elements, recursively removing a constraint from the element selector to create a modified element selector and querying the website using the modified element selector until the query returns one or more matching website elements, wherein the removed constraint comprises a class from a class list, a URL for a link, or a URL for an image; and modifying a cascading style sheet (CSS) property or CSS attribute of the website element to highlight the found element.

9. The system of claim 8, wherein the abstract representation further comprises a computed characteristic of the element.

10. The system of claim 8, wherein the modification of the CSS property or CSS attribute further comprises adding a CSS border to the element.

11. The system of claim 10, wherein the color of the CSS border indicates the type of action the second user should perform with respect to the highlighted element.

12. The system of claim 8, wherein the determined website element is a user-specific element, wherein the abstract representation comprises user-specific data related to the user-specific website element, and wherein the user-specific data is recognized as user-specific data and is not included as part of the element selector used to find the user-specific element.

13. The system of claim 8, wherein the website comprises HTML source code, wherein the stored step of the live help routine further comprises at least part of the HTML source code of the website, and wherein the server further performs the operations of:

rendering the stored HTML source code to generate an image; and comparing the rendered image with a live image of the website to find a matching website element.

\* \* \* \* \*